Feb. 24, 1942.  F. E. BLAIR  2,274,032
REPAIRING TOOL
Filed April 15, 1939  2 Sheets-Sheet 1
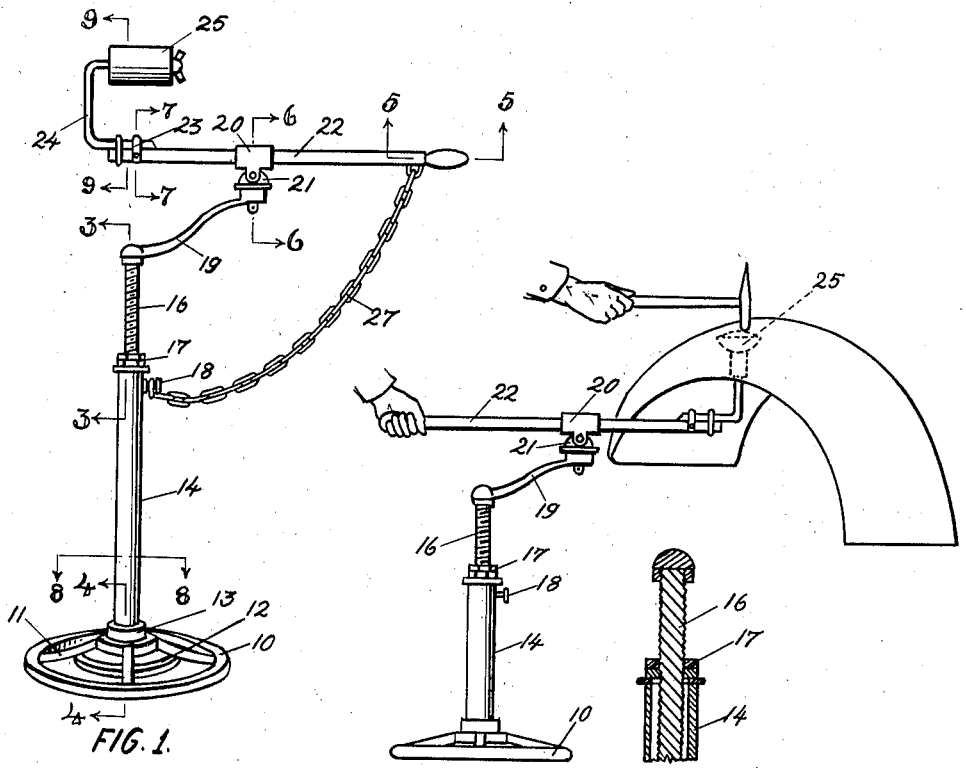
FIG.1.  FIG.2.  FIG.3.
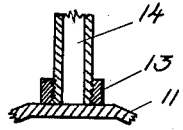 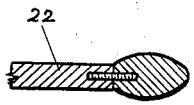 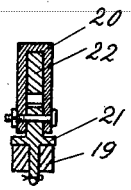
FIG.4.  FIG.5.  FIG.6.
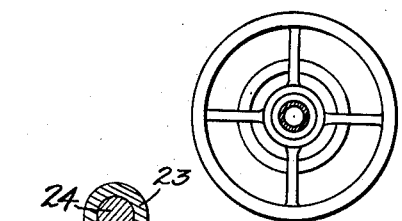
FIG.7.  FIG.8.  FIG.9.  FIG.10.
INVENTOR.
F. E. Blair.
E. J. Fetherstonhaugh.
ATTORNEY.

Feb. 24, 1942.  F. E. BLAIR  2,274,032
REPAIRING TOOL
Filed April 15, 1939  2 Sheets-Sheet 2

INVENTOR.
F. E. Blair
ATTORNEY.

Patented Feb. 24, 1942

2,274,032

UNITED STATES PATENT OFFICE 2,274,032

REPAIRING TOOL

Floyd Earl Blair, Bic, Quebec, Canada

Application April 15, 1939, Serial No. 268,048

1 Claim. (Cl. 153—32)

The invention relates to improvements in repairing tools as described in the present specification, and illustrated in the accompanying drawings that form part of the same.

The invention consists essentially in the novel features of construction as pointed out in the claim for novelty following a description in detail of the acceptable form of the invention.

The objects of the invention are to devise a tool for assisting the work of mechanics, garage workers and other persons in the removal of dents and other damages of a similar nature in the repairing of vehicle bodies and sundry articles; to speed up repair work and minimize the waste of time and labor that so often occurs in the handling of repairs; to furnish a repair tool that is adjustable and movable at various angles and thereby enable the use of the tool in otherwise practically inaccessible places; to enable the repair man or other person to carry out his work without the necessity of an assistant and consequently be of inestimable value in small repair shops or even in larger shops when taxed to their utmost in getting their work out on time; to construct a repair tool that will be made of comparatively few parts, simple to assemble and easy to handle and operate, and generally to provide a repair tool that will be of comparatively light weight and easily moved from place to place and that will be efficient for its various uses.

In the drawings, Figure 1 is a perspective view of the repair tool.

Figure 2 is a perspective view of the repair tool in use.

Figure 3 is a vertical sectional view as taken on the lines 3—3 in Figure 1.

Figure 4 is a vertical sectional view as taken on the lines 4—4 in Figure 1.

Figure 5 is a longitudinal sectional view as taken on the lines 5—5 in Figure 1.

Figure 6 is a cross sectional view as taken on the lines 6—6 in Figure 1.

Figure 7 is a cross sectional view as taken on the lines 7—7 in Figure 1.

Figure 8 is a plan view of the base.

Figure 9 is a vertical sectional view as taken on the lines 9—9 in Figure 1.

Figure 10 is a detail of one of the blocks.

Like numerals of reference indicate corresponding parts in the various figures.

Figure 12:
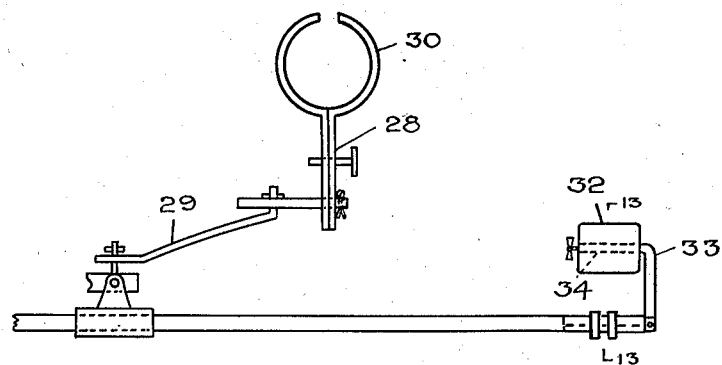
Figure 12 is a side elevation of the modified form of tool.
Figure 11:
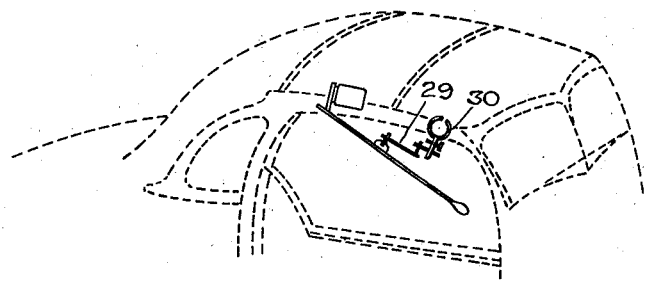
Figure 11 is a perspective view showing a modified form of the invention and its application.
Figures 13, 14:
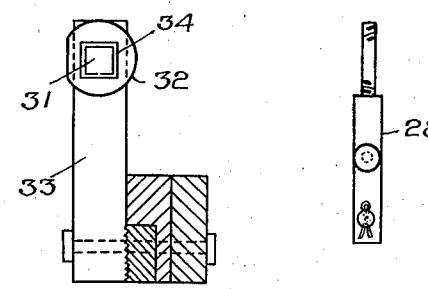
Figure 13 is a vertical sectional view as taken on the lines 13—13 in Figure 12.
Figure 14 is an end view of the clamp and bracket and block as illustrated in Figure 12.

It has been found in the past that great difficulty and inconvenience has been caused through the lack of the proper tool for engaging, or what might be called, supporting the under-surface of the article that has been dinted, and as everyone knows, particularly in the repairing of motor car bodies, that generally one mechanic or repairman is needed to support the block beneath the dinted surface of the piece of work, such as the mud-guard, or bodytop or other parts of the body of the car, while a second man is required to hammer out the crease or dents in that article, and although attempts have been made in the past to overcome this difficulty, and certain tools have been used which support themselves, yet there is a great lack of a repair tool that can be universally used in repairing the different parts of the body of the car, and it is therefore among other purposes of this invention to devise a repair tool to overcome this particular objection as well as being adaptable to be used as a jack in raising a mudguard into proper position for repairs.

Referring to the drawings, the repair tool consists of a suitable base as indicated by the numeral 10 suitably shaped to conform with the best practice, but as herein shown is formed of an approximate circular ring provided with the spokes 11 and re-inforced by the inner ring 12 terminating in the socket member 13 for the support of the standard or column 14. This standard may be made integral with the socket, or as a separate unit as the case may be The standard is hollow and is adapted to receive the externally threaded shaft 16 so that the height of the shaft may be secured at the various heights to the standard by means of the locking member 17 and the set screw 18, although it will of course be understood that other means may be utilized for moving the shaft up and down in the standard or column to accomplish the same purpose.

An arm 19 is secured to the shaft 16, and is preferably secured thereto at the top of the shaft, and may be fixedly or movably secured according to the best requirements, and this arm 19 is so constructed as to extend from the shaft at a desired angle, and is provided with an offset end 20 for the purpose of forming a journalling member for the clamp 21.

The offset arm 19 engages with the top of the shaft 16 and is also provided with a vertical orifice and through which a swivel block 21 is mounted. The sleeve 20 is mounted on the swivel block and is detachably secured thereto, and the lever 22 slidably engages with the sleeve and is provided with a U-shaped member at one end for engagement and support of the block 25.

The offset arm 19, the swivel block 21 and the sleeve 20 combine to form a kind of universal member, and which in co-operation with the slidable lever allows for a free movement and extension in any direction of the tool, and this is very essential in car body and fender repairs where there are so many curvital and vertical surfaces.

Naturally the standards may be made of various sizes so that a standard of one size may be secured to the base, and if it is required that the pole is to be used for the higher level than the shaft can extend to, the standard may be removed from the base and replaced by another of a longer length and the shaft introduced therein.

It will therefore be seen that the repair tool is so constructed that it may reach any varying length within reason, and the block may be placed at any angle desired in accordance with the work to be done. The repair tool is made of comparatively light material, and is easily transportable and is so constructed that it may be placed anywhere within the vehicle body for engagement with the various surfaces thereof.

When the tool is to be used as a lift jack for supporting mudguards, etc., a chain 27 is used for locking the lever or block to the standard and thereby support the mudguard or other member into the desired position.

In the modified form of the invention, it will be seen that the tool may be removed from the base and the standard and is so provided with a clamp 28 supporting a bracket 29 having an adjustable gripping member 30, which is capable of engaging with a strut or other member and consequently supports the tool, which is also provided with a block bracket 31 that may or may not be adjustable. This bracket 31 engaging with the block 32 which has a plurality of engaging surfaces, the block being movable on the journal member 33 and rubber washer 34 of the bracket 31.

In this way the tool may be used in places where it would be inconvenient to use a base and standard and therefore adds to its utility.

What I claim is:

A repair tool comprising a hollow standard having a base, a threaded shaft slidably mounted in said standard, a locking member internally threaded and supported at the top of said standard and engaging with said shaft, an offset arm secured to the top of said shaft, a swivel block secured to said offset arm, a sleeve mounted on said swivel block, a lever slidably engaging with said sleeve and having a U-shaped end, and a block secured to the U-shaped end of said lever.

FLOYD EARL BLAIR.